United States Patent
Wakayama

(10) Patent No.: US 8,594,667 B2
(45) Date of Patent: Nov. 26, 2013

(54) RADIO TERMINAL AND BASE STATION NOTIFICATION METHOD

(75) Inventor: Atsushi Wakayama, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 0 days.

(21) Appl. No.: 13/584,496

(22) Filed: Aug. 13, 2012

(65) Prior Publication Data
US 2013/0053030 A1 Feb. 28, 2013

(30) Foreign Application Priority Data
Aug. 24, 2011 (JP) .................. 2011-182442

(51) Int. Cl.
*H04W 4/00* (2009.01)
*H04W 36/00* (2009.01)

(52) U.S. Cl.
USPC ..................... 455/434; 455/422.1; 455/435.2; 455/444

(58) Field of Classification Search
USPC ........ 455/435.1–435.3, 434, 436, 442, 422.1, 455/444; 370/331, 332
See application file for complete search history.

(56) References Cited

U.S. PATENT DOCUMENTS

2011/0319076 A1 * 12/2011 Ramasamy et al. .......... 455/434

FOREIGN PATENT DOCUMENTS

| JP | 2010-016602 | * | 1/2010 | ............ H04W 48/18 |
| JP | 2010-016602 A | | 1/2010 | |

* cited by examiner

*Primary Examiner* — George Eng
*Assistant Examiner* — Jing Gao
(74) *Attorney, Agent, or Firm* — Maschoff Brennan

(57) ABSTRACT

In a radio terminal, while put in a waiting state in a second base station which covers a communication dead zone of a first base station, a search unit regularly searches for the first base station capable of communication. A notifying unit notifies a user of search results of the search unit in the case where the first base station is found by the search unit.

13 Claims, 17 Drawing Sheets

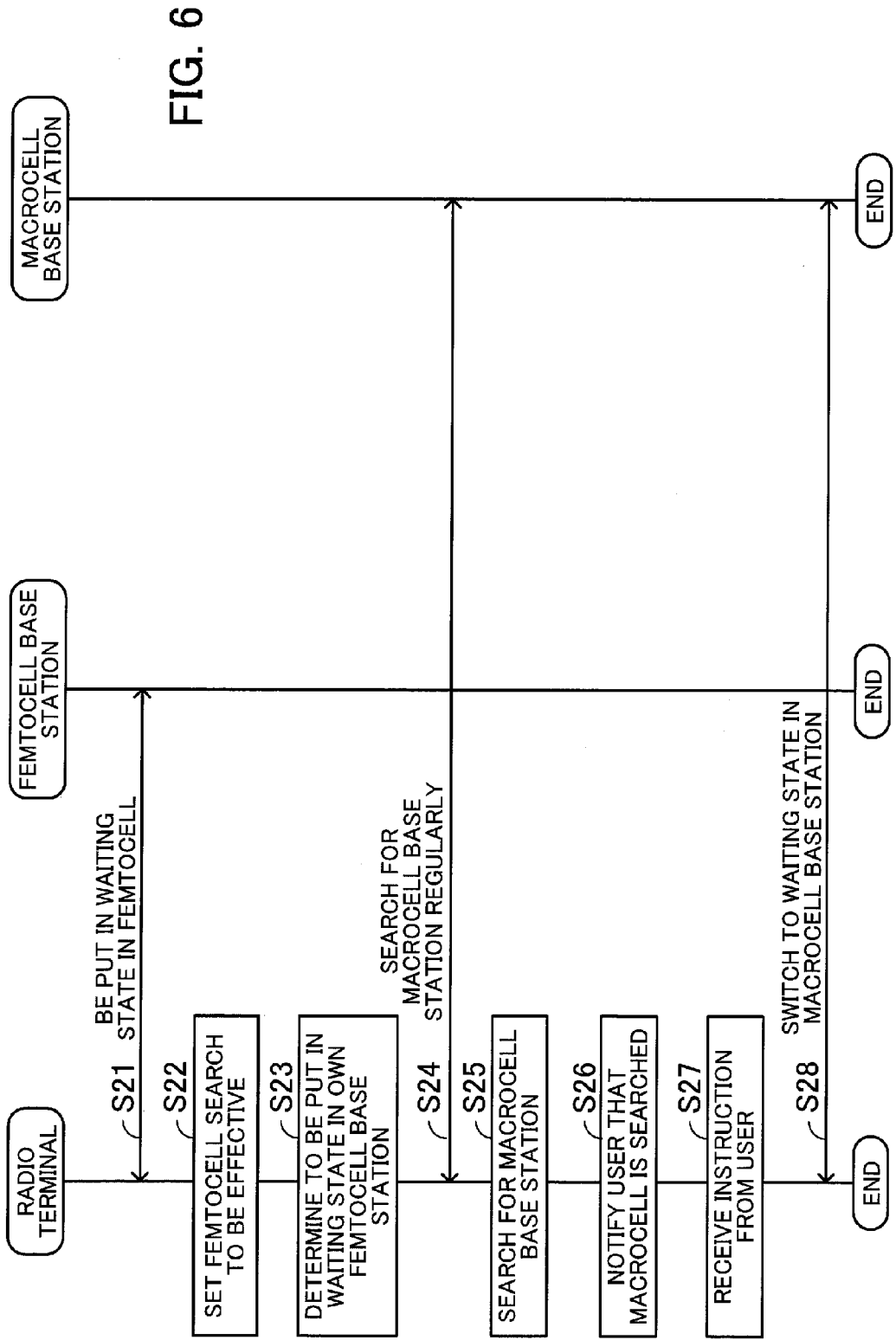

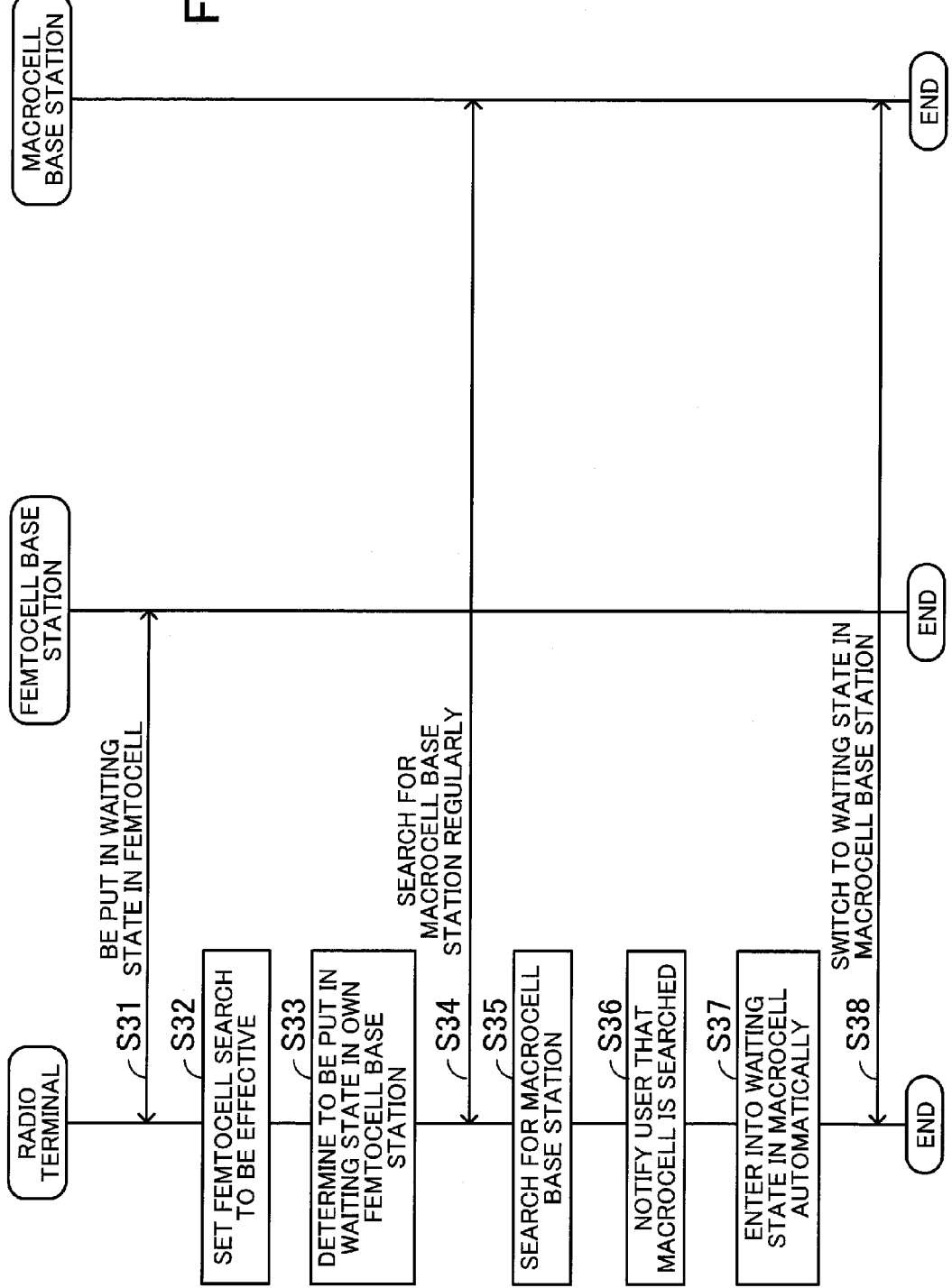

FIG. 14

| SERVICE | CELL TYPE |
|---|---|
| BROWSER | MACROCELL |
| MAIL | FEMTOCELL |
| TV TELEPHONE | FEMTOCELL |

61

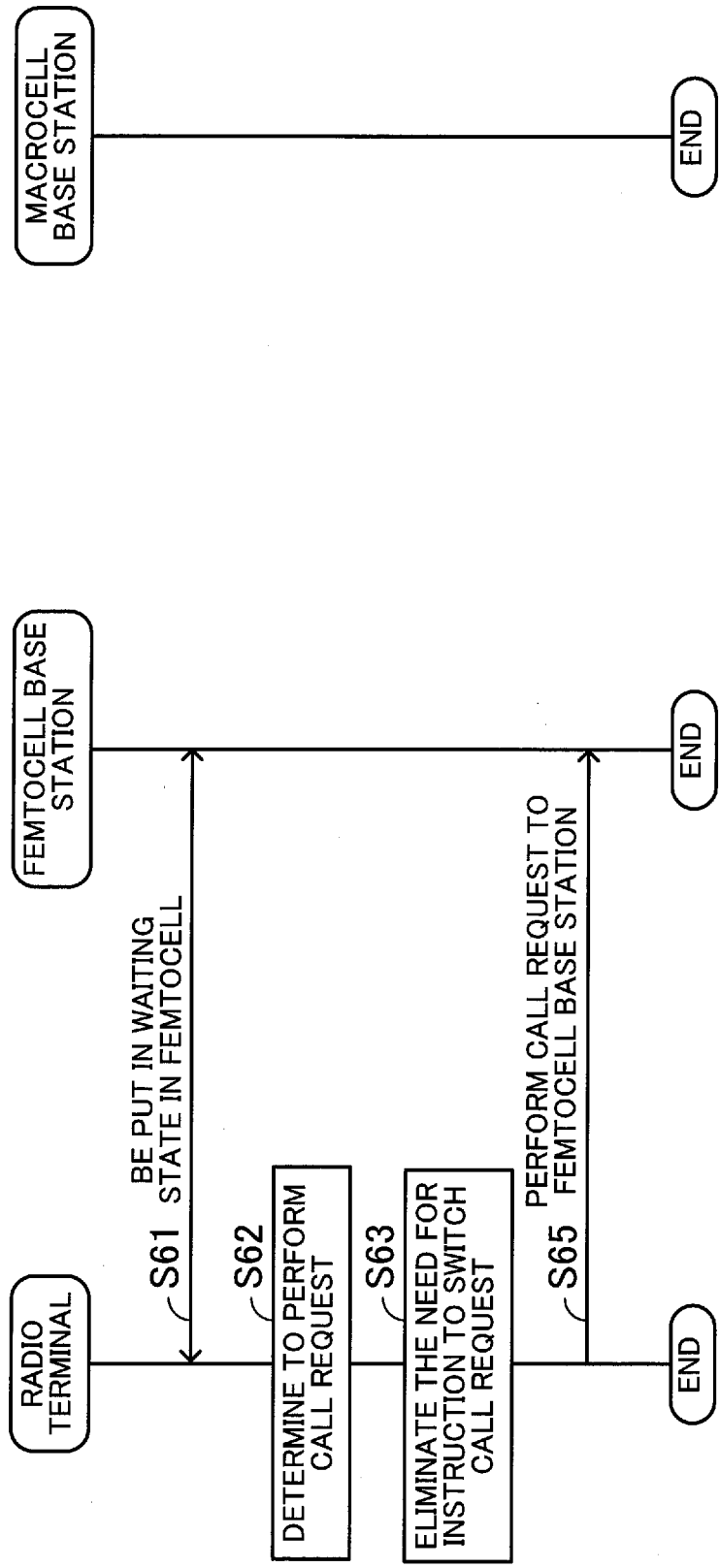

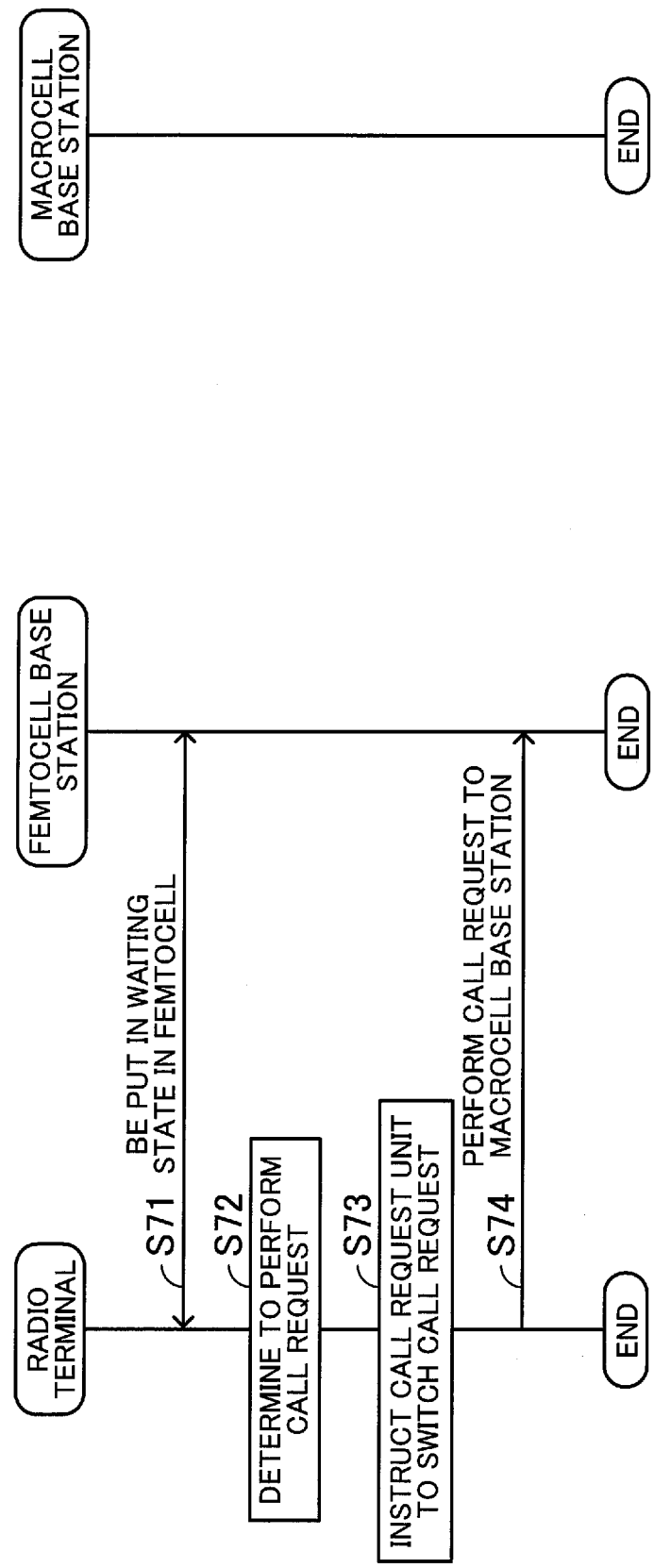

RADIO TERMINAL AND BASE STATION NOTIFICATION METHOD

CROSS-REFERENCE TO RELATED APPLICATION

This application is based upon and claims the benefit of priority of the prior Japanese Patent Application No. 2011-182442, filed on Aug. 24, 2011, the entire contents of which are incorporated herein by reference.

FIELD

The embodiments discussed herein are related to a radio terminal which performs radio communication and a base station notification method thereof.

BACKGROUND

In a mobile communication system such as a cellular phone, for example, there is used a cellular phone base station forming a macrocell having a radius of several hundred meters to ten and several kilometers. In a boundary area of both macrocells or in the surrounding of building such as a condominium or building, a dead zone in which radio field intensity is weak and communication is incapable of being performed is generated.

To cope with the problem, for example, as dead zone countermeasures, a communication dealer expands a femtocell service in which a small cell base station is arranged at each home. For example, when a femtocell base station forming a femtocell having a radius of several tens meters is arranged in a dead zone of a macrocell, a user is able to perform communication in the dead zone. The femtocell base station may be referred to as an access point base station.

A femtocell base station in which convenience is improved is conventionally provided (see, for example, Japanese Laid-open Patent Publication No. 2010-16602).

Incidentally, a user who installs a femtocell base station installs a femtocell base station, and then does not know whether its installation location belongs to a zone of a macrocell base station. Therefore, there is a problem that even in the case where a user is able to access the macrocell base station, the femtocell base station continues to be installed.

Suppose, for example, that since a radio wave from a macrocell base station fails to reach a home, a certain user installs a femtocell base station at the home. Suppose thereafter that radio wave conditions of the macrocell base station are improved and its installation location belongs to a zone of the macrocell base station.

However, even if the home belongs to a zone of the macrocell base station, a user does not know its fact and therefore continues to install a femtocell base station.

SUMMARY

In one aspect of the embodiments, there is provided a radio terminal capable of communication between a first base station and a second base station which covers a communication dead zone of the first base station. This radio terminal includes a search unit configured to search for the first base station capable of communication while put in a waiting state in the second base station, and a notifying unit configured to notify a user of search results of the search unit in the case where the first base station is found by the search unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a sequence diagram illustrating a mobile communication system in the case where automatic switching of a macrocell is not set;

FIG. 7 is a sequence diagram illustrating a mobile communication system in the case where automatic switching of a macrocell is set;

FIG. 14 illustrates a data configuration example of a service TB;

FIG. 16 is a part one of a sequence diagram of a mobile communication system in the case where a service is registered; and FIG. 17 is a part two of a sequence diagram of a mobile communication system in the case where a service is registered.

DESCRIPTION OF EMBODIMENTS

Figure 1:
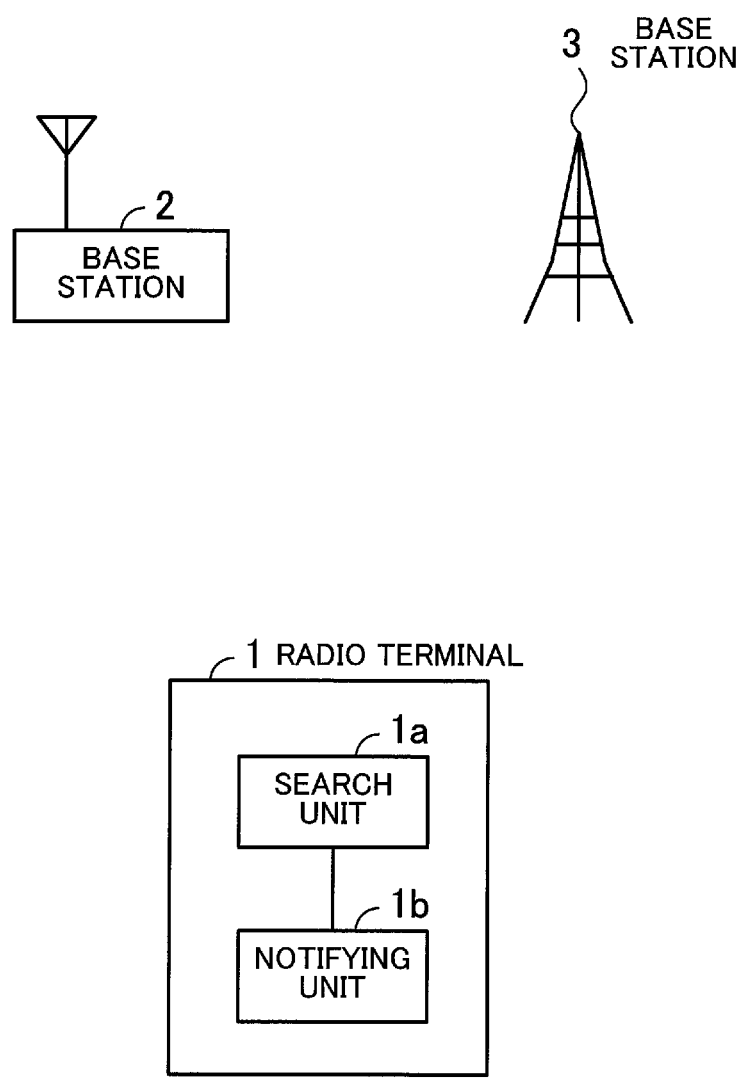
FIG. 1 illustrates a radio terminal according to a first embodiment.

Hereinafter, preferred embodiments of the present invention will now be described in detail below with reference to the accompanying drawings, wherein like reference numerals refer to like elements throughout.

First Embodiment

FIG. 1 illustrates a radio terminal according to a first embodiment. As illustrated in FIG. 1, the radio terminal 1 has a search unit 1a and a notifying unit 1b. FIG. 1 illustrates a base station 3 and also a base station 2 which covers a communication dead zone of the base station 3. Examples of the base station 2 include a femtocell base station, and examples of the base station 3 include a cellular phone base station. The cellular phone base station is also referred to as a macrocell base station. The radio terminal 1 performs radio communication with both of the base stations 2 and 3. Examples of the radio terminal 1 include a cellular phone.

The search unit 1a of the radio terminal 1 regularly searches for the base station 3 capable of communication while put in a waiting state in the base station 2. While put in a waiting state in the base station 2, for example, the search unit 1a searches for the base station 3 capable of the communication for each hour or for each day.

The waiting state means a state in which a power supply of the radio terminal 1 is powered on, signals are transmitted to the base station 2 or 3, and received from the base station 2 or 3.

In the case where the base station 3 is found by the search unit 1a, the notifying unit 1b notifies a user of the radio terminal 1 of search results of the search unit 1a. In the case where the base station 3 is found by the search unit 1a, for example, the notifying unit 1b displays on a display screen a notification indicating that the base station 3 is found, thereby notifying a user of the base station 3 found.

Hereinafter, operations of the radio terminal 1 will be described. Suppose first that a home of a user of the radio terminal 1 is located in a dead zone of the base station 3. Suppose therefore that the user of the radio terminal 1 installs the base station 2 at a home.

While put in the waiting state in the base station 2, the search unit 1a of the radio terminal 1 regularly searches for the base station 3 capable of communication. In the case where the base station 3 is found by the search unit 1a, the notifying unit 1b notifies the user of the radio terminal 1 of the search results of the search unit 1a.

Here, since the home of the user of the radio terminal 1 is located in a dead zone of the base station 3, the search unit 1a is unable to search for the base station 3. Accordingly, the notifying unit 1b does not notify the user of the search results.

Suppose then that radio wave conditions of the base station 3 are improved and a cell of the base station 3 covers the home of the user of the radio terminal 1. In this case, the base station 3 is found by the search unit 1a. On the display screen of the radio terminal 1, for example, the notifying unit 1b displays a notification indicating that the base station 3 is found, thereby notifying the user thereof That the search unit 1a searches for the base station 3 while put in the waiting state in the base station 2 means that the home of the user of the radio terminal 1 belongs to a communication zone of the base station 3. Specifically, the user may take away the base station 2 and perform communication via the base station 3, or continue installation of the base station 2 at the home and perform communication via the base station 2. In short, for example, when notified that the base station 3 is found from a display screen of the radio terminal 1, the user determines whether to continue the installation of the own base station 2.

As can be seen from the above discussion, in the case where the base station 3 capable of communication is regularly searched for and capable of being searched for while put in the waiting state in the base station 2, the radio terminal 1 notifies the user of the search results. Through the process, the user knows that the home belongs to a cell of the base station 3 and determines whether to continue the installation of the base station 2.

Second Embodiment

Next, a second embodiment will be described in detail with reference to the accompanying drawings.

Figure 2:
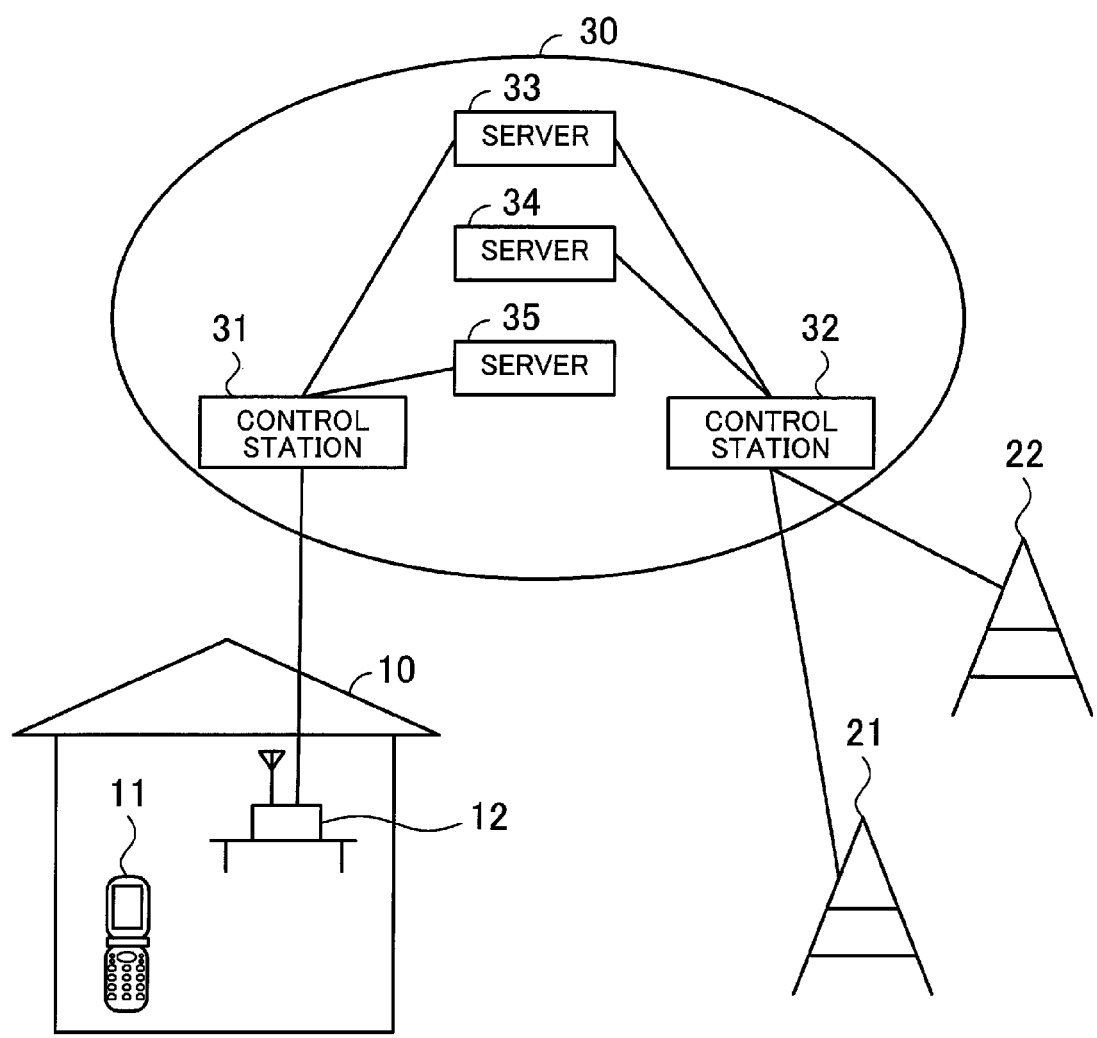
FIG. 2 illustrates an example of a mobile communication system to which a radio terminal is applied according to a second embodiment.

FIG. 2 illustrates an example of a mobile communication system to which a radio terminal is applied according to the second embodiment. As illustrated in FIG. 2, the mobile communication system has a radio terminal 11, a femtocell base station 12, macrocell base stations 21 and 22, and a network 30. A home 10 indicates a home of a user of the radio terminal 11.

Examples of the radio terminal 11 include a cellular phone. The radio terminal 11 performs radio communication with the femtocell base station 12 and the macrocell base stations 21 and 22. Through a CDMA (Code Division Multiple Access) or an LTE (Long Term Evolution), for example, the radio terminal 11 performs radio communication with the femtocell base station 12 and the macrocell base stations 21 and 22.

In the case of belonging to both a femtocell and a macrocell, the radio terminal 11 gives priority to a waiting state in the femtocell. Note that the radio terminal 11 enters into the waiting state in the macrocell depending on setting of a user.

The femtocell base station 12 forms, for example, a femtocell having a radius of several tens of meters. The femtocell base station 12 is connected to a control station 31 through a wire such as an optical fiber or ADSL (Asymmetric Digital Subscriber Line).

The femtocell base station 12 is provided, for example, to cover communication of dead zones of the macrocell base stations 21 and 22. In the example of FIG. 2, the home 10 of the user of the radio terminal 11 is located in the dead zone of the macrocell base stations 21 and 22, and the femtocell base station 12 is provided at the home 10 of the user of the radio terminal 11.

The macrocell base stations 21 and 22 each form, for example, a macrocell having a radius of several hundred meters to over ten kilometers. The macrocell base stations 21 and 22 are connected to the control station 32 through a wire.

The network 30 is formed by the control stations 31 and 32 and servers 33 to 35. Examples of the control stations 31 and 32 include RNC (Radio Network Control) and S-GW (Serving Gate Way).

Examples of the servers 33 to 35 include a server which provides to the radio terminal 11 a content service such as an image or music. The server 33 is connected to the control stations 31 and 32. The server 34 is connected to the control station 32. The server 35 is connected to the control station 31.

Accordingly, the radio terminal 11 receives service of the servers 33 and 35 via the femtocell base station 12 and the control station 31. In addition, the radio terminal 11 receives service of the servers 33 and 34 via the macrocell base stations 21 and 22 and the control station 32. Note that the radio terminal 11 is incapable of receiving service of the server 34 via the femtocell base station 12 and the control station 31. Further, the radio terminal 11 is incapable of receiving service of the server 35 via the macrocell base stations 21 and 22 and the control station 32.

Figure 3:
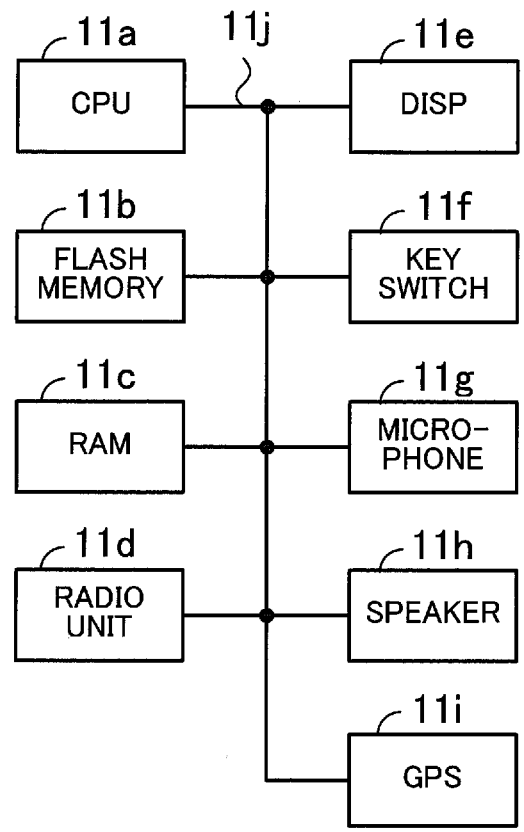
FIG. 3 illustrates a hardware configuration example of a radio terminal.

FIG. 3 illustrates a hardware configuration example of the radio terminal. As illustrated in FIG. 3, the radio terminal 11 has a CPU (Central Processing unit) 11a, a flash memory 11b, a RAM (Random Access Memory) 11c, a radio unit 11d, a display (DISP) 11e, a key switch 11f, a microphone 11g, a speaker 11h, a GPS (Global Positioning System) 11i, and a bus 11j.

To the CPU 11a, the flash memory 11b, the RAM 11c, the radio unit 11d, the DISP 11e, the key switch 11f, the microphone 11g, the speaker 11h, and the GPS 11i are connected via the bus 11j.

In the flash memory 11b, an application program executed by the CPU 11a is stored.

In the RAM 11c, data processed by the CPU 11a, and data as calculation results and in the middle of calculation are temporarily stored.

The radio unit 11*d* converts a radio signal received by an antenna into a baseband signal. Or, the radio unit 11*d* converts a baseband signal into a radio signal, and supplies it to the antenna. In addition, the radio unit 11*d* controls transmission and reception of signals between the femtocell base station 12 and the macrocell base stations 21 and 22.

Examples of the DISP 11*e* include an LCD (liquid Crystal Display). The DISP 11*e* receives data from the CPU 11*a* via the bus 11*j*, and displays it on a screen. The key switch 11*f* supplies the produced data to the CPU 11*a* via the bus 11*j*. For example, the microphone 11*g* converts a voice into an electrical signal. For example, the speaker 11*h* converts an electrical signal into a voice. The GPS 11*i* calculates position information (latitude and longitude) of the radio terminal 11 based on a signal from a satellite.

Figure 4:
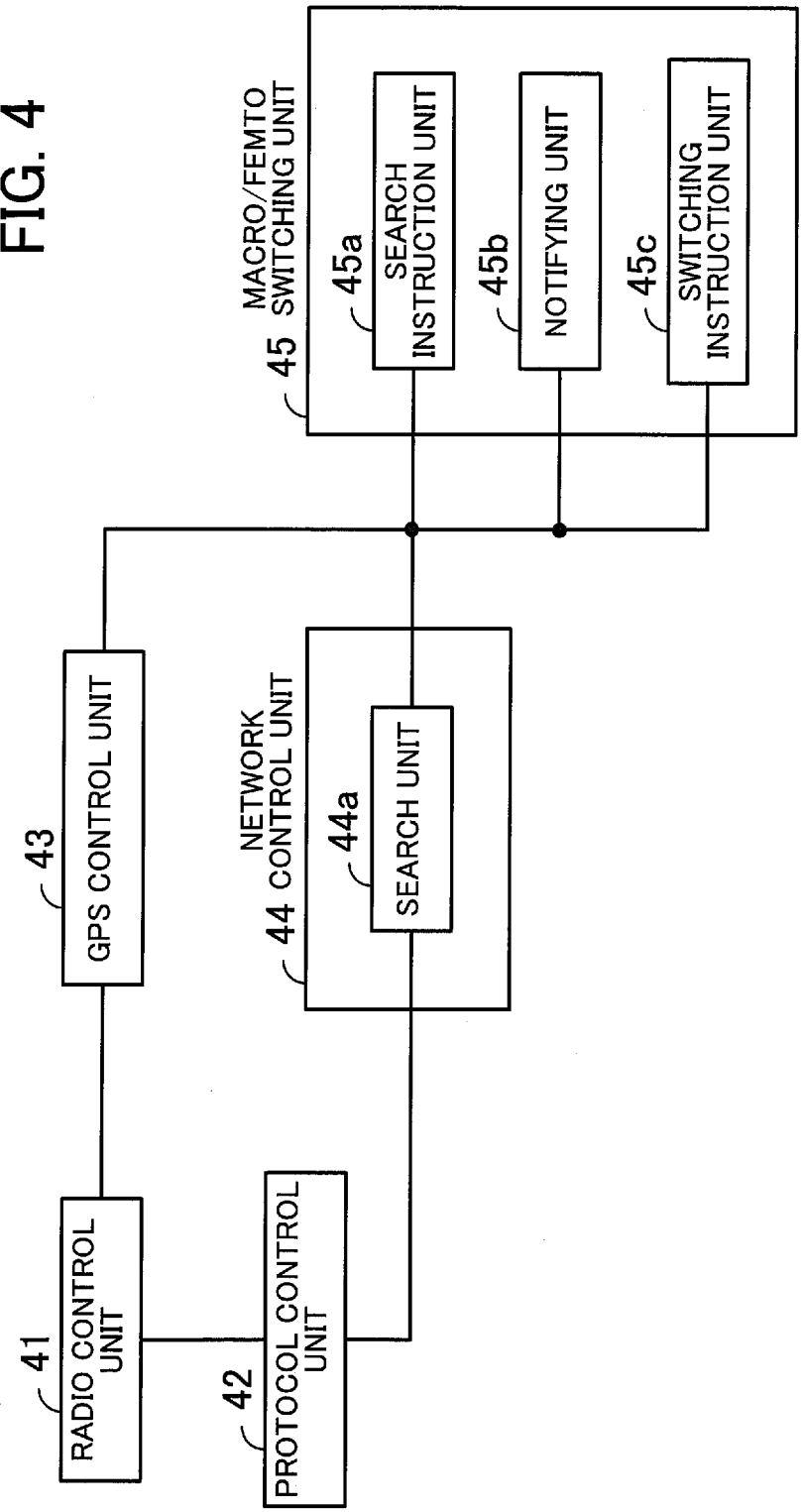
FIG. 4 illustrates a functional block of a radio terminal.

FIG. 4 is a functional block diagram of the radio terminal. As illustrated in FIG. 4, the radio terminal 11 has a radio control unit 41, a protocol control unit 42, a GPS control unit 43, a network control unit 44, and a macro/femto switching unit 45. Functions of the radio control unit 41 and the protocol control unit 42 illustrated in FIG. 4 are implemented, for example, by the radio unit 11*d* of FIG. 3. A function of the GPS control unit 43 is implemented, for example, by the GPS 11*i* of FIG. 3. Functions of the network control unit 44 and the macro/femto switching unit 45 are implemented, for example, by the CPU 11*a* of FIG. 3.

The radio control unit 41 converts a radio signal received by an antenna into a baseband signal. Or, the radio control unit 41 converts a baseband signal into a radio signal, and supplies it to the antenna.

The protocol control unit 42 controls transmission and reception of signals between the femtocell base station 12 and the macrocell base stations 21 and 22.

Based on a signal from the satellite, the GPS control unit 43 calculates position information (latitude and longitude) of the radio terminal 11.

The network control unit 44 has a search unit 44*a*. While put in a waiting state in the femtocell base station 12, the search unit 44*a* regularly searches for the macrocell base stations 21 and 22 capable of communication. While put in the waiting state in the femtocell base station 12, for example, the search unit 44*a* searches for the macrocell base stations 21 and 22 capable of communication for each hour or for each day.

Based on position information of the radio terminal 11 produced from the GPS control unit 43, the search unit 44*a* determines whether to be put in the waiting state in the femtocell base station 12. In the flash memory 11*b* illustrated in FIG. 3, for example, position information that the home 10 or the femtocell base station 12 is installed is stored. Based on the position information stored in the flash memory 11*b* and the position information produced from the GPS control unit 43, the search unit 44*a* determines whether to be put in the waiting state in the femtocell base station 12. For example, when the position information produced from the GPS control unit 43 is within a predetermined radius centering on the position information stored in the flash memory 11*b*, the search unit 44*a* determines to be put in the waiting state in the femtocell base station 12.

The reason why the search unit 44*a* determines whether to be put in the waiting state in the femtocell base station 12 installed by the user is that the radio terminal 11 may access a femtocell base station of another user. Suppose, for example, that the radio terminal 11 searches a macrocell while put in the waiting state in the femtocell base station of the another user and that effect is displayed on the DISP 11*e* illustrated in FIG. 3. In this case, the user of the radio terminal 11 determines whether to continue the installation of the femtocell base station installed by the another user.

The search unit 44*a* regularly searches for the macrocell base stations 21 and 22 according to an instruction from the search instruction unit 45*a*. In the case where a search instruction is received from the search instruction unit 45*a*, for example, the search unit 44*a* regularly searches for the macrocell base stations 21 and 22. On the other hand, in the case where the search instruction is not received from the search instruction unit 45*a*, the search unit 44*a* fails to regularly search for the macrocell base stations 21 and 22.

Through a pilot signal transmitted from the macrocell base stations 21 and 22, for example, the search unit 44*a* calculates radio field intensity of the macrocell base stations 21 and 22, and searches for the macrocell base stations 21 and 22. In the case where the radio field intensity of the macrocell base stations 21 and 22 is larger than or equal to a predetermined threshold, for example, the search unit 44*a* determines that the macrocell base stations 21 and 22 are found (present within a macrocell zone).

In the case where a waiting instruction in the macrocell is received from the switching instruction unit 45*c*, the search unit 44*a* stops a preference waiting of the femtocell and enters into a waiting state in the macrocell. From a state belonging to a femtocell of the femtocell base station 12, for example, the home 10 illustrated in FIG. 2 is supposed to belong to both of the femtocell of the femtocell base station 12 and the macrocell of the macrocell base station 21. In this case, the search unit 44*a* gives priority to the waiting state in the femtocell base station 12; however, in the case where the switching instruction from the switching instruction unit 45*c* is received, the search unit 44*a* enters into the waiting state in the macrocell base station 21.

The macro/femto switching unit 45 has a search instruction unit 45*a*, a notifying unit 45*b*, and a switching instruction unit 45*c*. The search instruction unit 45*a* supplies to the search unit 44*a* an instruction whether the macrocell base stations 21 and 22 are regularly found.

The search instruction unit 45*a* receives a user input, for example, from the key switch 11 f illustrated in FIG. 3 and supplies to the search unit 44*a* the instruction whether the search is regularly performed. In the case where a user of the radio terminal 11 sets the key switch 11*f* to search for the macrocell base stations 21 and 22, for example, the search instruction unit 45*a* instructs the search unit 44*a* to search for the macrocell base stations 21 and 22 capable of communication.

In the case where the macrocell base stations 21 and 22 are found by the search unit 44*a*, the notifying unit 45*b* notifies the user of the radio terminal 11 of search results of the search unit 44*a*. In the case where the macrocell base station 21 is found by the search unit 44*a*, for example, the notifying unit 45*b* displays on the DISP 11*e* a notification to the effect that the macrocell base station 21 is found, thereby notifying the user thereof. Or alternatively, the notifying unit 45*b* may notify the user thereof by using a sound through the speaker 11*h*.

In the case where the radio terminal 11 belongs also to macrocells of the macrocell base stations 21 and 22 at the home 10, the switching instruction unit 45*c* instructs the search unit 44*a* to enter into the waiting state in the macrocell based on the setting or instruction of the user. In the case where the user sets the key switch 11*f* to automatically perform macrocell switching, for example, when the macrocell is searched by the search unit 44*a*, the switching instruction unit 45*c* instructs the search unit 44*a* to automatically enter into the waiting state in the macrocell. Further, in the case where the setting is not performed to automatically perform macrocell switching by the user, the switching instruction unit 45c instructs the search unit 44a to enter into the waiting state in the macrocell through the key switch 11f based on the instruction from the user.

Figure 5:
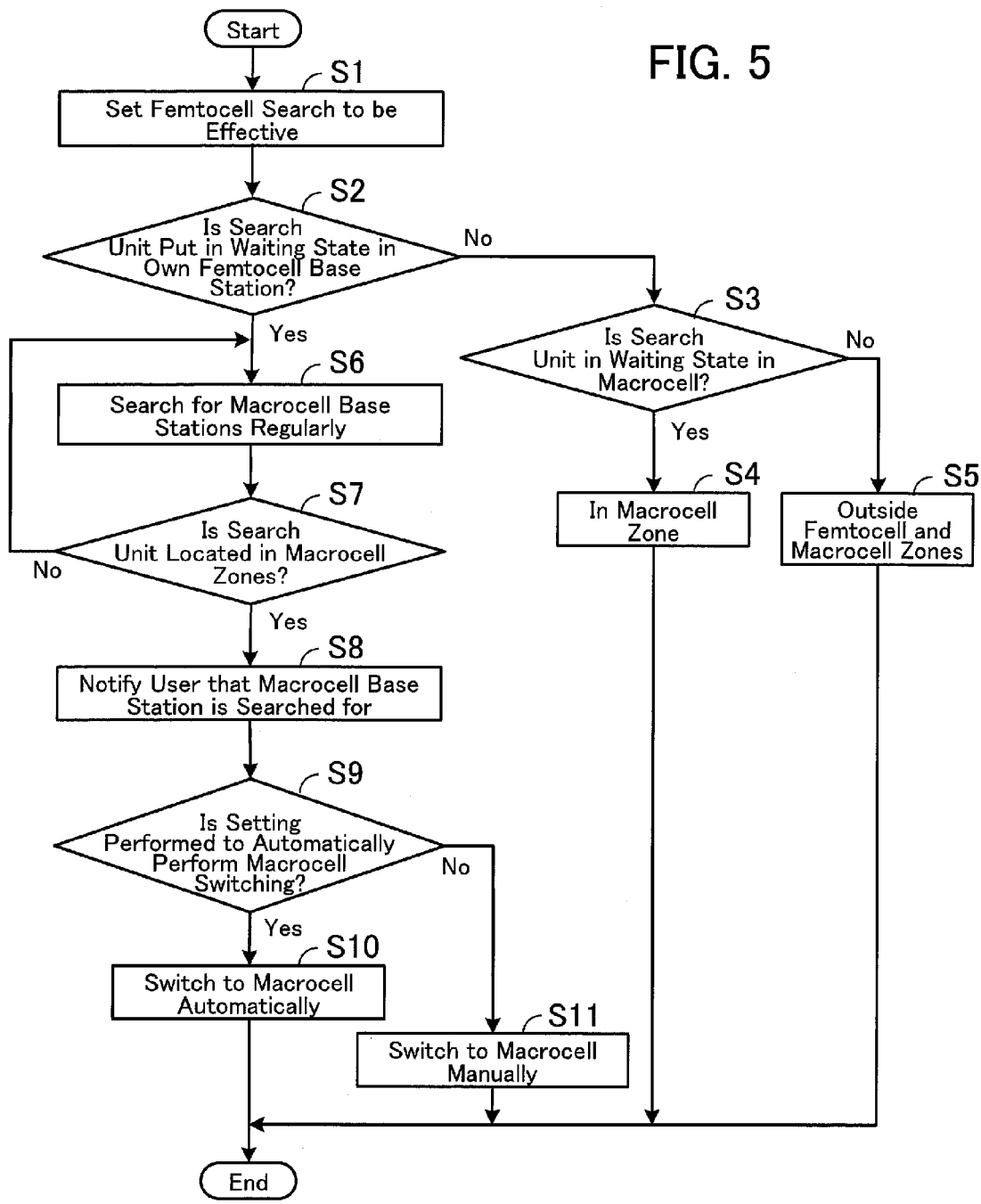
FIG. 5 is a flowchart illustrating operations of a radio terminal.

FIG. 5 is a flowchart illustrating operations of the radio terminal.

(Step S1) Suppose that the search instruction unit 45a sets a femtocell search to be effective. Suppose specifically that the search instruction unit 45a is instructed to regularly search for the macrocell base stations 21 and 22 by the user.

(Step S2) Based on the position information of the GPS control unit 43, the search unit 44a determines whether to be put in the waiting state in the own femtocell base station. Specifically, the search unit 44a determines whether to be put in the waiting state in the femtocell base station 12 of the home 10. If so, the process advances to step S6. If not, the process proceeds to step S3.

(Step S3) The search unit 44a determines whether to be put in the waiting state in the macrocell. If so, the process advances to step S4. If not, the process proceeds to step S5.

(Step S4) The search unit 44a determines that the radio terminal 11 is located in the macrocell zone.

(Step S5) The search unit 44a determines that the radio terminal 11 is located outside the femtocell and macrocell zones.

(Step S6) The search unit 44a regularly searches for the macrocell base stations 21 and 22 capable of communication. For example, the search unit 44a searches for the macrocell base stations 21 and 22 capable of communication in each hour or in each day.

(Step S7) The search unit 44a determines whether to be located in the macrocell zones of the macrocell base stations 21 and 22. If so, the process advances to step S8. If not, the process returns to step S6.

(Step S8) The notifying unit 45b notifies the user of the radio terminal 11 of the search results of the search unit 44a. In the case where the macrocell base station 21 is found by the search unit 44a, for example, the notifying unit 45b displays on the DISP 11e a notification to the effect that the macrocell base station 21 is found, thereby notifying the user thereof.

(Step S9) The switching instruction unit 45c determines through the key switch 11f whether the setting is performed to automatically perform macrocell switching by the user. If so, the process advances to step S10. If not, the process proceeds to step S11.

(Step S10) The switching instruction unit 45 c instructs the search unit 44a to automatically switch to the macrocell a cell in which the search unit 44a is put in a waiting state.

(Step S11) The switching instruction unit 45c instructs the search unit 44a to manually switch to the macrocell a cell in which the search unit 44a is put in the waiting state. In the case where an instruction to switch to the macrocell a cell in which the search unit 44a is put in the waiting state is given by the user, for example, the switching instruction unit 45c instructs the search unit 44a to switch it from a cell in which the search unit 44a is put in the waiting state in the femtocell base station 12 to a cell in which the search unit 44a is put in the waiting state in the macrocell base station 21.

FIG. 6 is a sequence diagram illustrating the mobile communication system in the case where automatic switching of the macrocell is not set. Suppose in FIG. 6 that the switching instruction unit 45c is not set to automatically perform macrocell switching by the user.

(Step S21) Suppose that the search unit 44a is put in the waiting state in the femtocell.

(Step S22) Suppose that the search instruction unit 45a sets the femtocell search to be effective. Suppose specifically that the search instructing unit 45a is instructed by the user to regularly search for the macrocell base stations 21 and 22.

(Step S23) Based on the position information of the GPS control unit 43, the search unit 44a determines whether to be put in the waiting state in the own femtocell base station. Suppose here that the search unit 44a determines to be put in the waiting state in the own femtocell base station (femtocell base station 12).

(Step S24) The search unit 44a regularly searches for the macrocell base stations 21 and 22 capable of communication.

(Step S25) Suppose that the search unit 44a searches for the macrocell base station 21 as a macrocell base station capable of communication.

(Step S26) The notifying unit 45b notifies the user of the radio terminal 11 that a macrocell of the macrocell base station 21 is searched.

(Step S27) The switching instruction unit 45c receives a switching instruction of the macrocell from the user. Suppose here that the switching instruction unit 45c receives from the user the instruction to perform the switching of the macrocell.

(Step S28) The search unit 44a switches a cell from a cell in which the search unit 44a is put in the waiting state in the femtocell base station 12 to a cell in which the search unit 44a is put in the waiting state in the macrocell base station 21.

FIG. 7 is a sequence diagram illustrating the mobile communication system in the case where an automatic switching of the macrocell is set. Suppose in FIG. 7 that the switching instruction unit 45c is set to automatically perform the macrocell switching by the user.

Processes of steps S31 to S36 illustrated in FIG. 7 are the same as those of steps S21 to S26 illustrated in FIG. 6, and their descriptions will not be repeated.

(Step S37) The switching instruction unit 45c instructs the search unit 44a to automatically enter into the waiting state in the macrocell.

(Step S38) The search unit 44a switches a cell from a cell in which its own unit is put in the waiting state in the femtocell base station 12 to a cell in which its own unit is put in the waiting state in the macrocell base station 21.

FIGS. 8A, 8B, 8C, and 8D each illustrate a screen example of the display in the case where the automatic switching of the macrocell is not set.

Figure 8A:
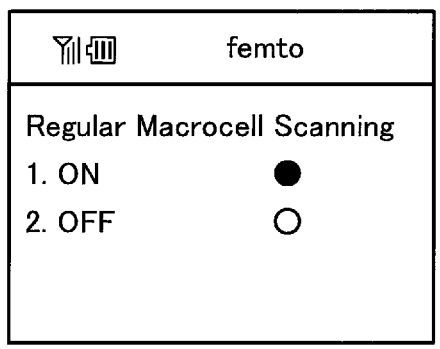
FIGS. 8A, 8B, 8C, and 8D each illustrate a screen example of a display in the case where automatic switching of a macrocell is not set.

FIG. 8A illustrates a screen example of regular search setting of the macrocell. The user of the radio terminal 11 selects 'ON' or 'OFF' through an operation of the key switch 11f.

In the case where 'ON' is selected, the search instruction unit 45a instructs the search unit 44a to search for the macrocell base stations 21 and 22 capable of communication. In the case where 'OFF' is selected, the search instruction unit 45a fails to instruct the search unit 44a to search for the macrocell base stations 21 and 22 capable of communication. In the example of FIG. 8A, since 'ON' is selected, the search instruction unit 45a instructs the search unit 44a to search for the macrocell base stations 21 and 22 capable of communication.

Figure 8B:
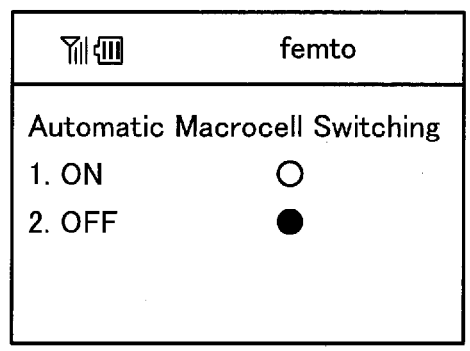

FIG. 8B illustrates a screen example of automatic switch setting of the macrocell. The user of the radio terminal 11 sets 'ON' or 'OFF' through the operation of the key switch 11f. In the example of FIG. 8B, 'OFF' is set.

Figure 8C:
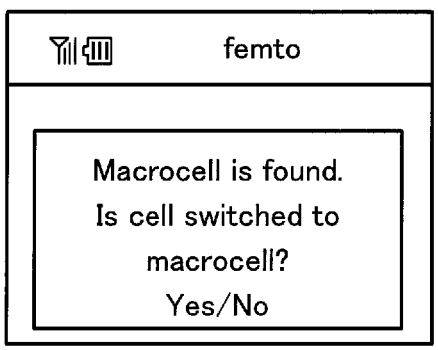

FIG. 8C illustrates a screen example in the case where the macrocell is searched. When the macrocell is searched by the search unit 44a, the notifying unit 45b displays the screen as illustrated in FIG. 8C and notifies the user that the macrocell is found. As illustrated in FIG. 8C, on the DISP 11e of the radio terminal 11, there is displayed a screen for inquiring of the user whether the switching is performed from the femtocell to the macrocell.

Figure 8D:
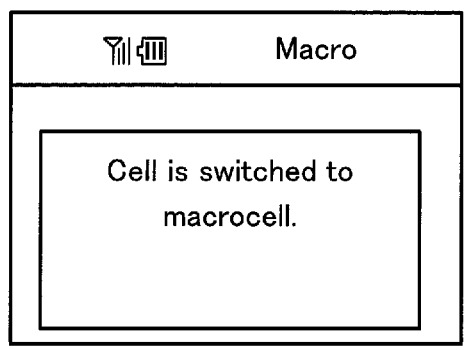

FIG. 8D illustrates a screen example at the time when the switching is performed from the femtocell to the macrocell. In FIG. 8C, in the case where the user selects 'YES' through the operation of the key switch 11f, the switching instruction unit 45c instructs the search unit 44a to switch a waiting state from the femtocell to the macrocell. Through the process, as illustrated in FIG. 8D, the DISP 11e of the radio terminal 11 displays that the waiting state is switched from the femtocell to the macrocell. In FIG. 8D, an upper display of the DISP 11e is changed from 'femto' to 'Macro'.

Figure 9A:
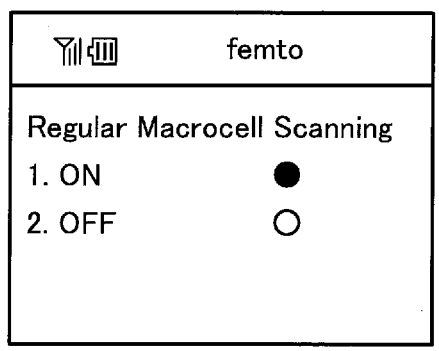
FIGS. 9A, 9B, and 9C each illustrate a screen example of a display in the case where automatic switching of a macrocell is set.
Figure 9B:
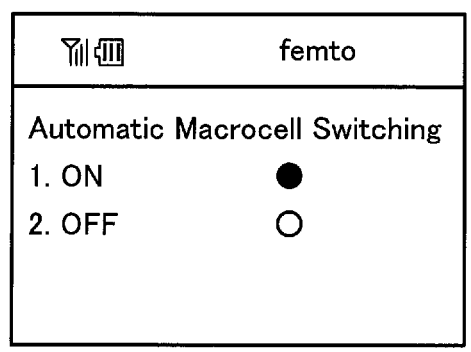
Figure 9C:
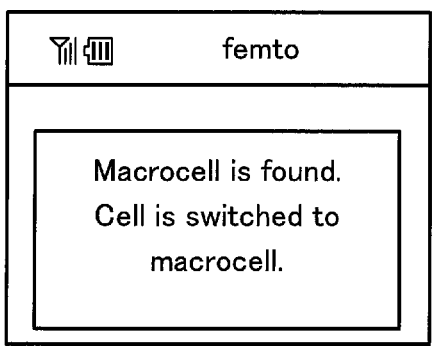

FIGS. 9A, 9B, and 9C each illustrate a screen example of the display in the case where the automatic switching of the macrocell is set.

FIG. 9A illustrates a screen example of the regular search setting of the macrocell. FIG. 9A is the same as FIG. 8A, and the descriptions will not be repeated.

FIG. 9B illustrates a screen example of the automatic switch setting of the macrocell. In FIG. 9A, 'ON' is set in contrast with the example of FIG. 8B.

FIG. 9C illustrates a screen example in the case where the macrocell is searched. When the macrocell is searched by the search unit 44a, the notifying unit 45b displays a screen as illustrated in FIG. 8C and notifies the user that the macrocell is found. Since the automatic switching of the macrocell is set, the search unit 44a automatically switches the waiting state from the femtocell to the macrocell. As illustrated in FIG. 9C, the DISP 11 e displays that 'the macrocell is found' and 'the waiting state is switched to the macrocell'.

As can be seen from the above sequence, the radio terminal 11 regularly searches for the macrocell base stations 21 and 22 capable of communication while put in the waiting state in the femtocell base station 12. In the case where the macrocell base stations 21 and 22 are found, the radio terminal 11 further notifies the user of the search results. Through the process, the user knows that the home 10 belongs to the macrocells of the macrocell base stations 21 and 22, and determines whether to continue the installation of the femtocell base station 12.

When receiving a notification to the effect that the home 10 belongs to the macrocell, the user determines that the installation of the femtocell base station 12 need not be continued. In this case, for example, the user cancels a femtocell communication contract with a communication dealer, and realizes reduction in costs.

In addition, the user eliminates the need to pay cost (e.g., optical line costs) for connecting the femtocell base station 12 to the network 30 and realizes reduction in costs.

From the user, the radio terminal 11 further receives whether to search the macrocell. Through the process, the user who desires to continue the installation of the femtocell base station 12 sets the femtocell so as not to search the macrocell, thus continuing the installation of the femtocell base station 12.

In the above, based on the position information of the GPS control unit 43, the search unit 44a determines whether to be put in the waiting state in the femtocell base station 12 of the home 10. With respect to the above, the search unit 44a may receive identification data indicating an own femtocell base station from the femtocell base station 12 and determine whether to be put in the waiting state in the femtocell base station 12 of the home 10.

In 3GPP (3rd Generation Partnership Project), for example, a Cell ID is broadcasted through System Information from the base station. In the case where the Cell ID broadcasted from the base station is a Cell ID of the femtocell base station 12, the search unit 44a determines to be put in the waiting state in the femtocell base station 12 of the home 10.

In 3GPP2, a BASE ID is further broadcasted through a System Parameters Message from the base station. In the case where the Base ID broadcasted from the base station is a Base ID of the femtocell base station 12, the search unit 44a determines to be put in the waiting state in the femtocell base station 12 of the home 10. During the installation of the femtocell base station 12, in the radio terminal 11, the user previously stores identification data such as the Cell ID or BASE ID of the femtocell base station 12. The identification data such as the Cell ID or BASE ID is stored, for example, in the flash memory 11b illustrated in FIG. 3.

Third Embodiment

Next, a third embodiment will be described in detail with reference to the accompanying drawings. In the third embodiment, in the case where a radio terminal belongs to both a femtocell and a macrocell and is incapable of accessing a server via one cell, it accesses the server via the other cell. A mobile communication system according to the third embodiment is the same as that of FIG. 2, and the descriptions will not be repeated. In addition, a hardware configuration example of the radio terminal according to the third embodiment is the same as that of FIG. 3, and the descriptions will not be repeated.

Figure 10:
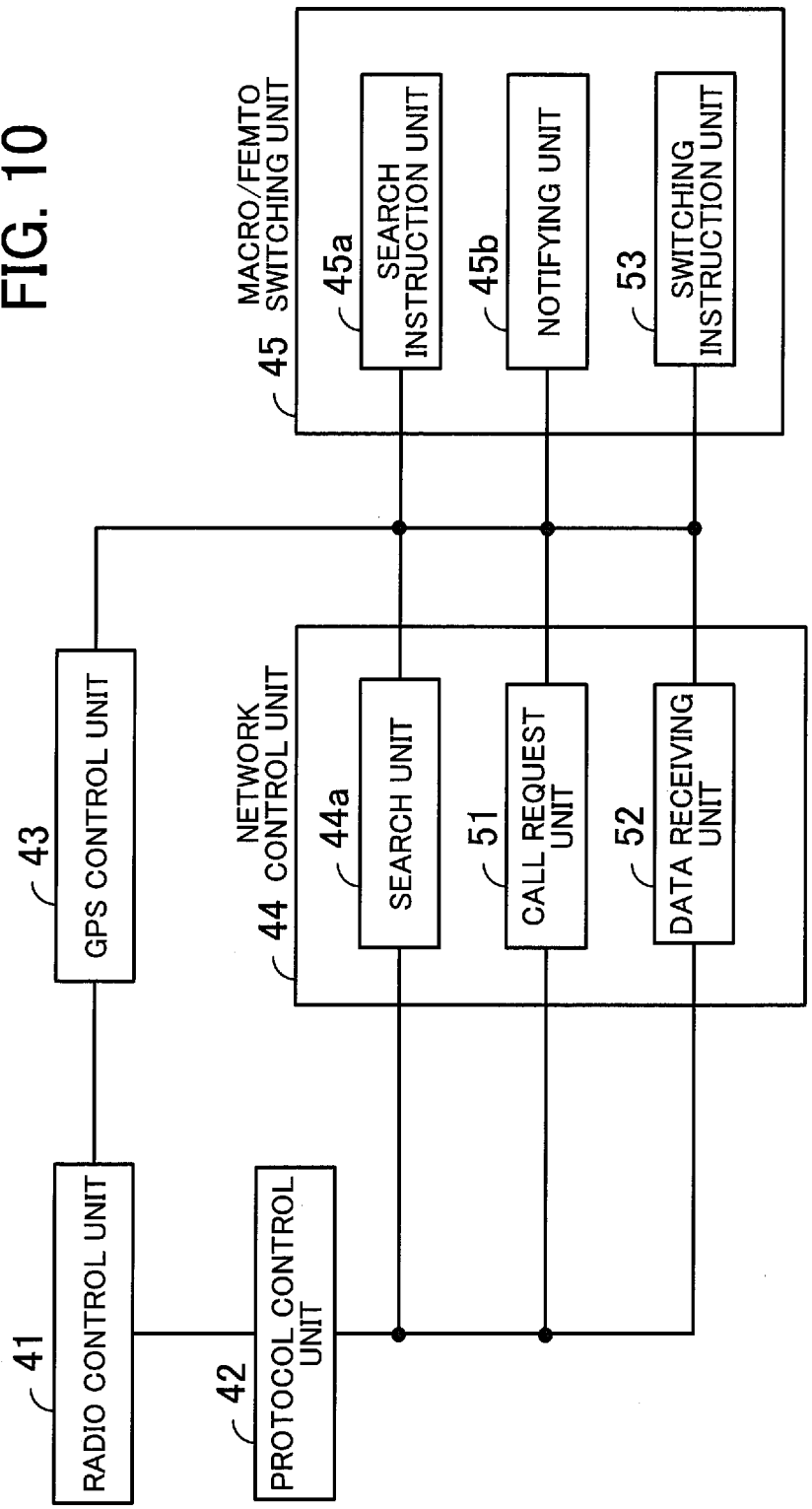
FIG. 10 illustrates a functional block diagram of a radio terminal according to a third embodiment.

FIG. 10 is a functional block diagram illustrating the radio terminal according to the third embodiment. In FIG. 10, the same circuit elements as those of FIG. 4 are indicated by the same reference numerals as in FIG. 4, and the descriptions will not be repeated.

According to the operation of the key switch 11f of the user, a call request unit 51 performs a call request to the base station of a cell in which the search unit 44a is put in the waiting state. Suppose, for example, that the search unit 44a is put in the waiting state in the femtocell base station 12. Suppose that the user accesses the server 33. In this case, the call request unit 51 performs a call request to the femtocell base station 12. Or, suppose that the search unit 44a is put in the waiting state in the macrocell base station 21. Suppose that the user accesses the server 34. In this case, the call request unit 51 performs a call request to the femtocell base station 12.

A data receiving unit 52 receives data from the servers 33 to 35 via a base station which performs a call request. For example, in the case where the call request unit 51 performs a call request to the femtocell base station 12 and accesses the server 33, the data receiving unit 52 receives data from the server 33 via the femtocell base station 12.

The switching instruction unit 53 has the same functions as those of the switching instruction unit 45c illustrated in FIG. 4. In the case where the data receiving unit 52 receives information on failed connection to the servers 33 to 35, the switching instruction unit 53 instructs the call request unit 51 to switch a base station to a base station of another cell so as to perform a call request thereto.

Suppose, for example, that the user accesses the server 34. Since the search unit 44a is put in the waiting state in the femtocell base station 12, the call request unit 51 is supposed to perform a call request to the femtocell base station 12. Since the server 34 is not connected to the control station 31, the data receiving unit 52 receives information on the failed connection to the server 34 from the control station 31. In this case, the switching instruction unit 53 instructs the call request unit 51 to switch a base station to the macrocell base station 21 so as to perform a call request thereto. Specifically, in the case where the call request unit 51 performs a call request to one of the femtocell base station 12 and the macrocell base stations 21 and 22 and is incapable of accessing the servers 33 to 35, the switching instruction unit 53 instructs the call request unit 51 to switch a base station to the other base station so as to perform a call request thereto.

Figure 11:
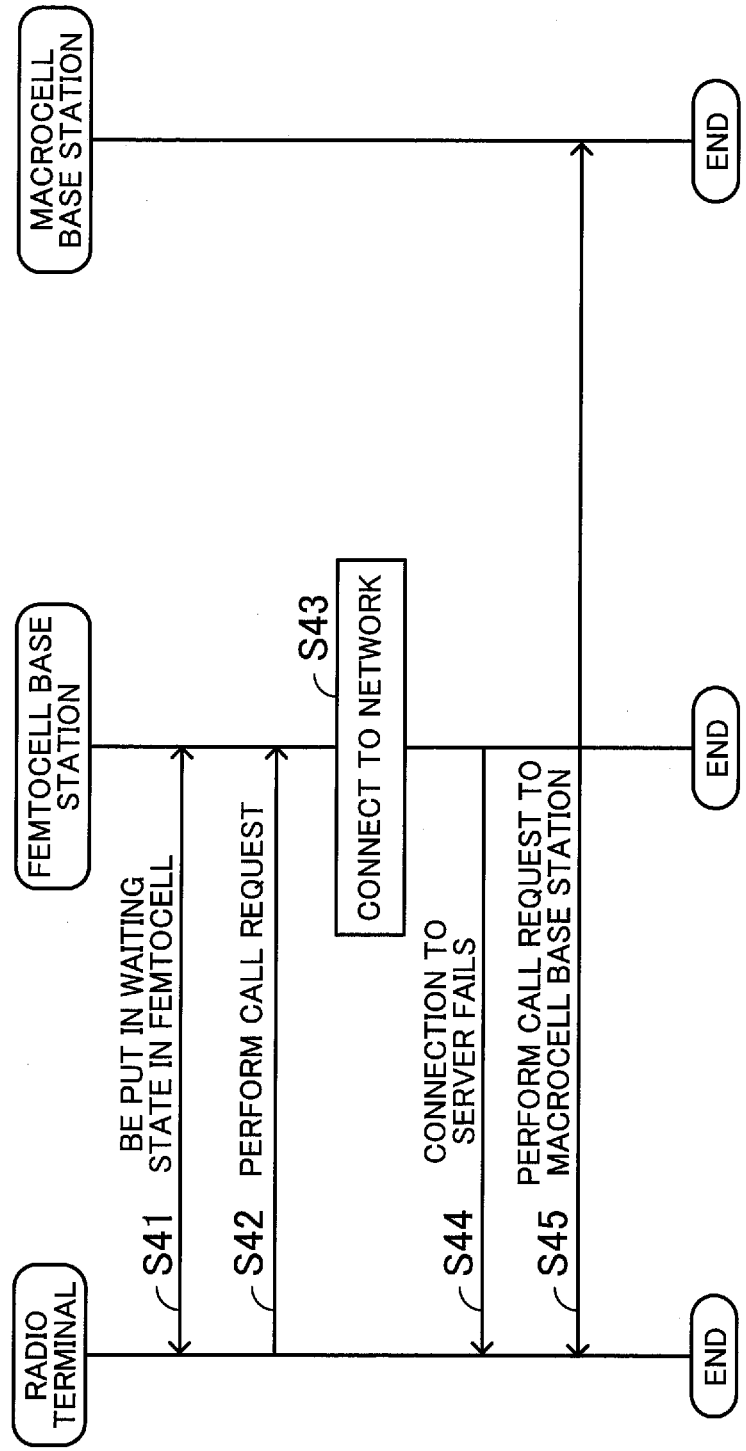
FIG. 11 is a sequence diagram illustrating a mobile communication system in the case where a radio terminal performs a call request in a femtocell.

FIG. 11 is a sequence diagram illustrating the mobile communication system in the case where the radio terminal performs a call request to the femtocell. Suppose, for example, that the radio terminal 11 searches the macrocell for the macrocell base station 21 based on the operations illustrated in the second embodiment. The user is supposed to continue an installation of the femtocell base station 12 even if the macrocell is searched, and the radio terminal 11 is supposed to belong to both the cells of the femtocell base station 12 and the macrocell base station 21.

(Step S41) Suppose that the search unit 44a is put in the waiting state in a femtocell of the femtocell base station 12.

(Step S42) The call request unit 51 performs a call request to the femtocell base station 12 based on an access request to the server 34 from the user. Since the search unit 44a is put in the waiting state in a femtocell of the femtocell base station 12, the call request unit 51 performs a call request to the femtocell base station 12.

(Step S43) The femtocell base station 12 is connected to the network 30.

(Step S44) The control station 31 of the network 30 is not connected to the server 34 as illustrated in FIG. 2. Accordingly, from the control station 31, the femtocell base station 12 receives information to the effect that the connection to the server 34 fails, and transmits that information to the radio terminal 11.

(Step S45) From the femtocell base station 12, the data receiving unit 52 receives information to the effect that the connection to the server 34 fails. The switching instruction unit 53 receives information from the data receiving unit 52, and instructs the call request unit 51 to switch a base station to the macrocell base station 21 so as to perform a call request thereto. The call request unit 51 performs a call request to the macrocell base station 21 based on the switching instruction from the switching instruction unit 53.

The macrocell base station 21 is connected to the control station 32, and the control station 32 is connected to the server 34. Accordingly, the data receiving unit 52 receives data from the server 34.

Figure 12:
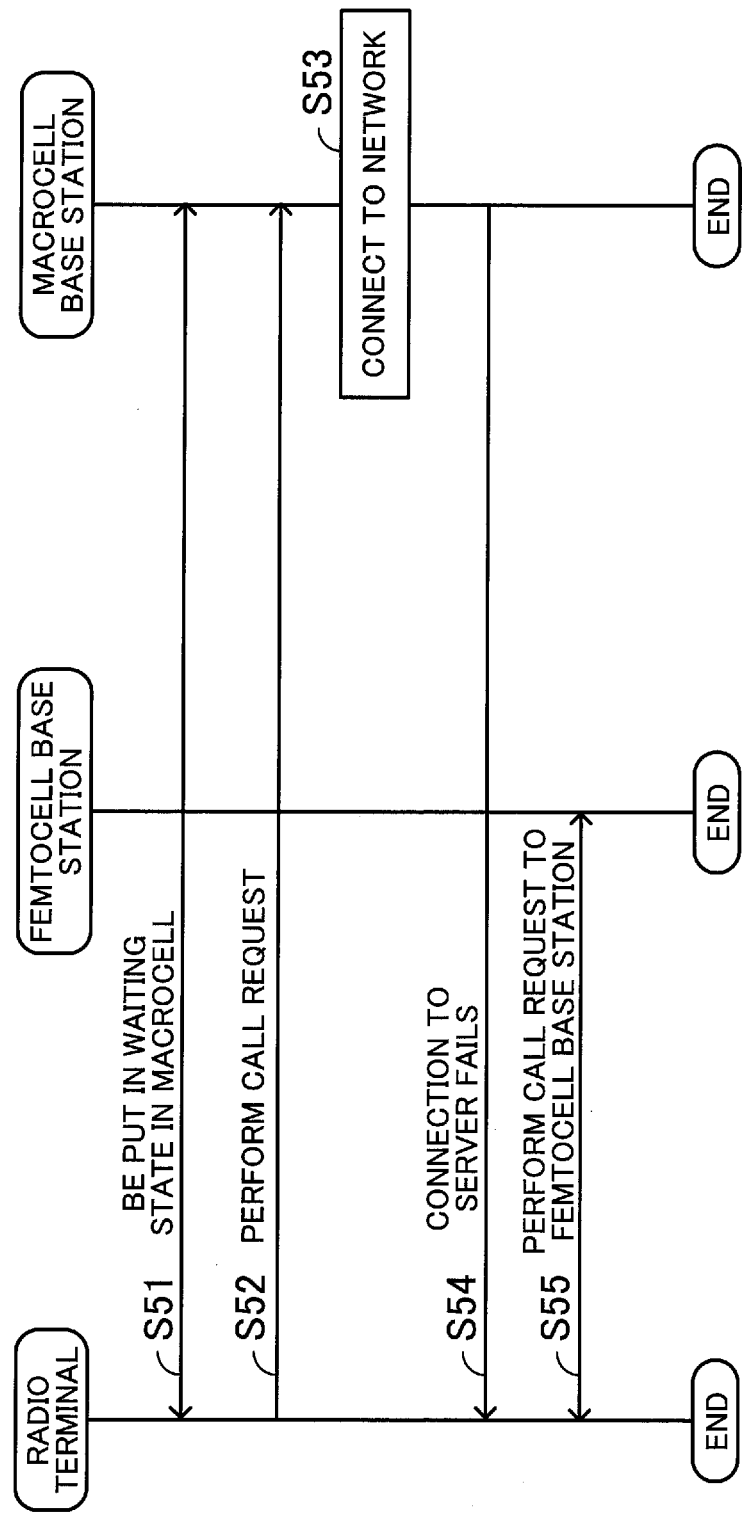
FIG. 12 is a sequence diagram illustrating a mobile communication system in the case where a radio terminal performs a call request in a macrocell.

FIG. 12 is a sequence diagram illustrating the mobile communication system in the case where the radio terminal performs a call request to the macrocell. Suppose, for example, that the radio terminal 11 searches a macrocell for the macrocell base station 21 based on the operations illustrated in the second embodiment. The user is supposed to continue an installation of the femtocell base station 12 even if the macrocell is searched, and the radio terminal 11 is supposed to belong to both the cells of the femtocell base station 12 and the macrocell base station 21.

(Step S51) Suppose that the search unit 44a is put in the waiting state in a macrocell of the macrocell base station 21.

(Step S52) The call request unit 51 performs a call request to the macrocell base station 21 based on an access request to the server 35 from the user. Since the search unit 44a is put in the waiting state in a macrocell of the macrocell base station 21, the call request unit 51 performs a call request to the macrocell base station 21.

(Step S53) The macrocell base station 21 is connected to the network 30.

(Step S54) The control station 32 of the network 30 is not connected to the server 35 as illustrated in FIG. 2. Accordingly, the macrocell base station 21 receives information to the effect that the connection to the server 35 from the control station 32 fails, and transmits that information to the radio terminal 11.

(Step S55) From the macrocell base station 21, the data receiving unit 52 receives information to the effect that the connection to the server 35 fails. The switching instruction unit 53 receives information from the data receiving unit 52, and instructs the call request unit 51 to switch a base station to the femtocell base station 12 so as to perform a call request thereto. The call request unit 51 performs a call request to the femtocell base station 12 based on the switching instruction from the switching instruction unit 53.

The femtocell base station 12 is connected to the control station 31, and the control station 31 is connected to the server 35. Accordingly, the data receiving unit 52 receives data from the server 35.

As can be seen from the above sequence, suppose that the radio terminal 11 belongs to both of the femtocell and the macrocell. In the case where an access to a server through one cell is incapable of being performed, an access to the server through the other cell is performed. As a result, the user receives a desired service of his or her own.

For example, in the case where service such as MC-Rev. A or IPVT (Internet Protocol Video Telephony) is incapable of being received through the femtocell base station 12, the radio terminal 11 accesses the macrocell base station 21. As a result, through the macrocell base station 21, the user receives service incapable of being received through the femtocell base station 12. In the same manner, through the femtocell base station 12, the user receives service incapable of being received through the macrocell base station 21.

Fourth Embodiment

Next, a fourth embodiment will be described in detail with reference to the accompanying drawings. In the fourth embodiment, in the case where a radio terminal belongs to both a femtocell and a macrocell, when an access request is performed from a user to a certain server, a call request is performed to a registered base station. A mobile communication system according to the fourth embodiment is the same as that of FIG. 2, and the descriptions will not be repeated. Further, a hardware configuration example of the radio terminal according to the fourth embodiment is the same as that of FIG. 3, and the descriptions will not be repeated.

Figure 13:
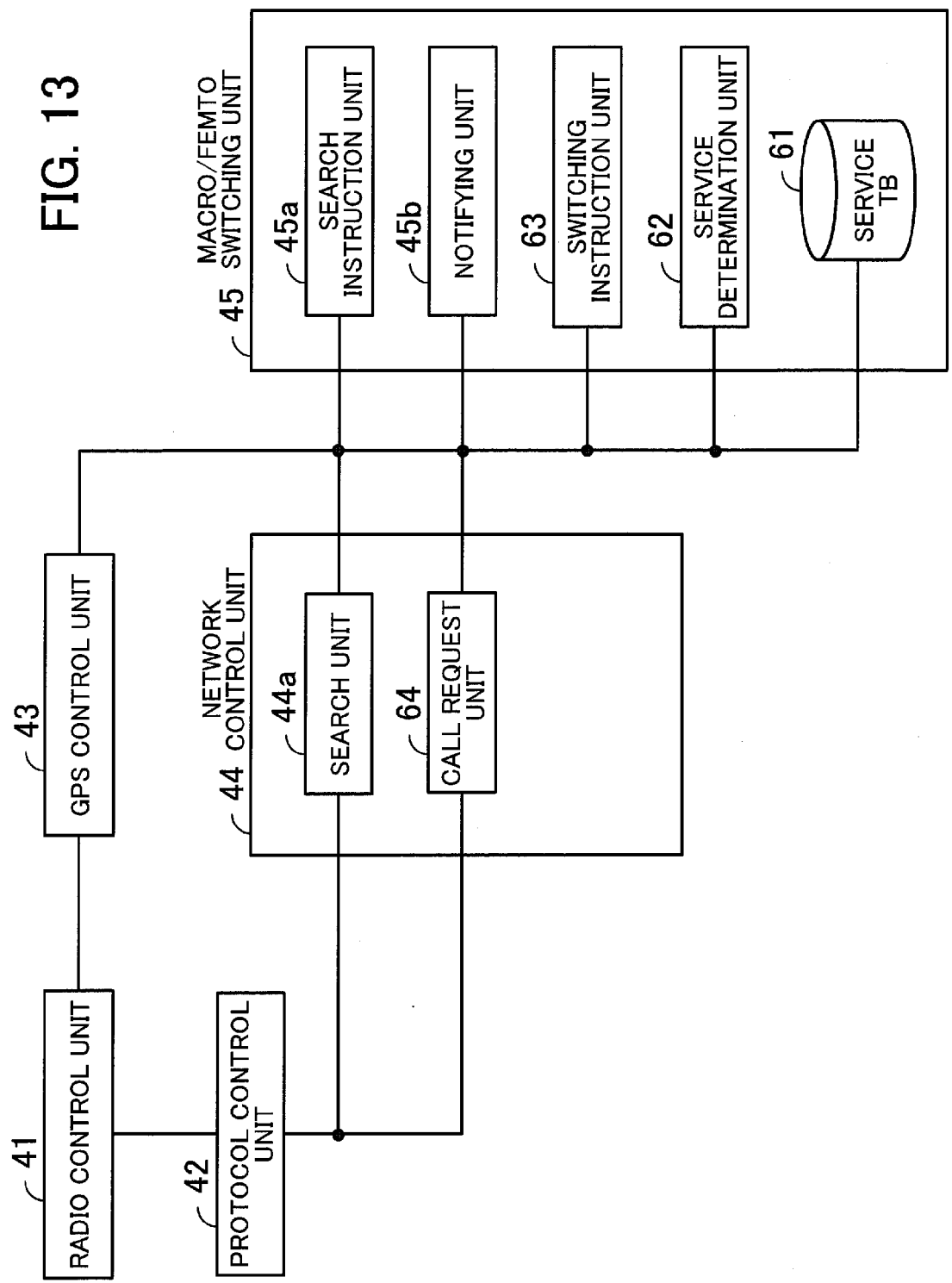
FIG. 13 is a functional block diagram illustrating a radio terminal according to a fourth embodiment.

FIG. 13 is a functional block diagram illustrating the radio terminal according to the fourth embodiment. In FIG. 13, the same circuit elements as those of FIG. 4 are indicated by the same reference numerals as in FIG. 4, and the descriptions will not be repeated.

A service TB (TB: Table) 61 associates service to be received by a user with a type of a cell for receiving the service and stores them. The service TB 61 is stored, for example, in the flash memory 11b illustrated in FIG. 3. Information of the service TB 61 is registered by the user of the radio terminal 11.

FIG. 14 illustrates a data configuration example of the service TB. As illustrated in FIG. 14, the service TB 61 has a column of the service and that of a cell type.

In the column of the service, the information of the service to be received by the user is stored. In the column of the cell type, the information of the cell type for receiving the service in the service column is stored.

Suppose, for example, that the user receives service of a TV telephone by using the radio terminal 11. In this case, it is seen from the lowermost column of the service TB 61 illustrated in FIG. 14 that the user accesses a server who provides the TV telephone service through the femtocell (the femtocell base station 12 installed by the user).

Referring again to FIG. 13, the service determination unit 62 refers to the service TB 61 based on the service to be received by the user and determines whether to perform a call request to a base station of which cell.

Suppose, for example, that the user receives the TV telephone service. In this case, in the example of FIG. 14, the service determination unit 62 determines to perform a call request to the femtocell base station 12. Suppose further that the user receives service (service of the Web server) of a browser. In this case, in the example of FIG. 14, the service determination unit 62 determines to perform a call request to the macrocell base stations 21 and 22.

The switching instruction unit 63 has the same function as that of the switching instruction unit 45c illustrated in FIG. 4. The switching instruction unit 63 determines whether a base station in which the search unit 44a is put in the waiting state is matched with the base station determined by the service determination unit 62. In the case where the base station in which the search unit 44a is put in the waiting state is not matched with the base station determined by the service determination unit 62, the switching instruction unit 63 instructs a call request unit 64 to switch a base station to which a call request is performed.

Suppose, for example, that the search unit 44a is put in the waiting state in the femtocell base station 12. Suppose that the service determination unit 62 determines to access the macrocell base stations 21 and 22. In this case, since the base station in which the search unit 44a is put in the waiting state differs from the base station determined by the service determination unit 62, the switching instruction unit 63 instructs the call request unit 64 to search for the macrocell base stations 21 and 22, and switch a base station to the macrocell base stations 21 and 22 so as to perform a call request thereto.

Suppose further that the search unit 44a is put in the waiting state in the macrocell base station 21. Suppose that the service determination unit 62 determines to access the femtocell base station 12. In this case, since the base station in which the search unit 44a is put in the waiting state differs from the base station determined by the service determination unit 62, the switching instruction unit 63 instructs the call request unit 64 to search for the femtocell base station 12, and switch a base station to the femtocell base station 12 so as to perform a call request thereto.

Specifically, in the case where a base station which responds to information on the service to be received by the user differs from a base station in which the search unit 44a is put in the waiting state, the switching instruction unit 63 instructs the call request unit 64 to switch a base station to which a call request is performed.

The call request unit 64 performs a call request to a base station of a cell in which the search unit 44a is put in the waiting state. Note that in the case where the switching instruction unit 63 instructs the call request unit 64 to switch a base station to which a call request is performed, the call request unit 64 switches the base station to which a call request is performed.

Suppose, for example, that the search unit 44a is put in the waiting state in the femtocell base station 12. Suppose that the service determination unit 62 determines to instruct the search unit 44a to switch a base station to the macrocell base stations 21 and 22 so as to perform a call request thereto. In this case, the call request unit 64 searches a macrocell and performs a call request to the macrocell base stations 21 and 22 of the searched macrocell.

Suppose further that the search unit 44a is put in the waiting state in the macrocell base station 21. Suppose that the service determination unit 62 determines to instruct the call request unit 64 to switch a base station to the femtocell base station 12 so as to perform a call request thereto. In this case, the call request unit 64 searches for the femtocell base station 12 and performs a call request thereto.

Figure 15A:
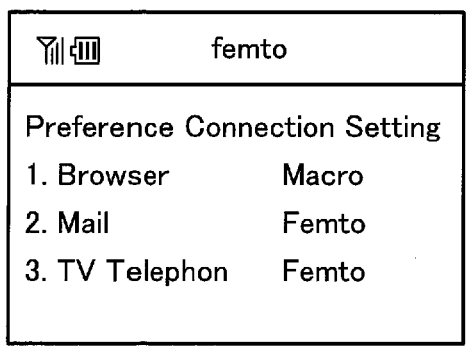
FIGS. 15A, 15B, and 15C each illustrate a screen example of a display in which a service is registered.
Figure 15B:
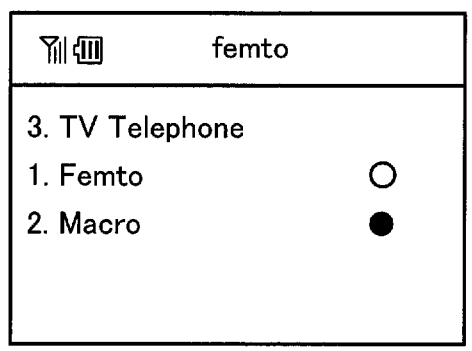
Figure 15C:
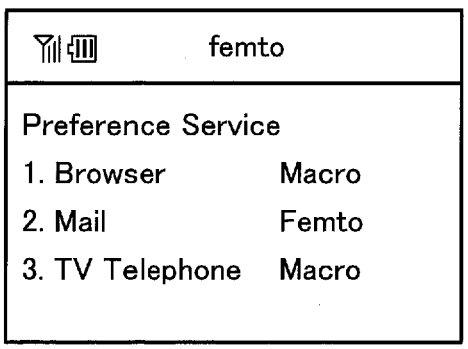

FIGS. 15A, 15B, and 15C each illustrate a screen example of the display in which service is registered.

FIG. 15A illustrates a screen example of service to be received by a user and a type of a cell for receiving the service. For example, it is seen from FIG. 15A that to receive the service of 'browser', a user receives it by using a macrocell. Further, it is seen that to receive the service of the TV telephone, the user receives it by using a femtocell.

FIG. 15B illustrates an example of a screen in which a type of the cell for receiving the service is set with respect to the service to be received by a user. Suppose, for example, that in the screen example illustrated in FIG. 15A, the user desires to switch a cell for receiving the service of the TV telephone from the 'femtocell' to the 'macrocell'. In this case, the user selects '3' through an operation of the key switch 11f. Through the process, a screen of the DISP 11e of the radio terminal 11 is switched from a screen example of FIG. 15A to that of FIG. 15B. Through the operation of the key switch 11f, for example, the user then selects 'macro' as indicated in a black circle of FIG. 15B.

FIG. 15C illustrates an example of a screen after the switching of service setting. As described above, suppose, for example, that the user switches a cell for receiving the service of the TV telephone from a femtocell to a macrocell. In this case, as illustrated in FIG. 15C, the cell for receiving the service of the TV telephone is switched from 'femto' to 'macro'.

FIG. 16 is a part one of a sequence diagram of the mobile communication system in the case where the service is registered. Suppose, for example, that the information illustrated in FIG. 14 is registered in the service TB 61.

(Step S61) Suppose that the search unit 44a is put in the waiting state in a femtocell of the femtocell base station 12.

(Step S62) Suppose that the user of the radio terminal 11 receives certain service by using the radio terminal 11. Based on the service to be received by the user, the service determination unit 62 refers to the service TB 61, and determines to perform a call request to a base station of which cell.

Suppose here that the user receives the service of the TV telephone. Accordingly, the service determination unit 62 refers to the service TB61, and determines to perform a call request to the femtocell base station 12.

(Step S63) The switching instruction unit 63 determines whether a base station in which the search unit 44a is put in the waiting state is matched with a base station determined by the service determination unit 62.

In an example of FIG. 16, at step S61, the search unit 44a is put in the waiting state in the femtocell base station 12. At step S62, the service determination unit 62 determines to perform a call request to the femtocell base station 12. Accordingly, the switching instruction unit 63 determines that the base station in which the search unit 44a is put in the waiting state is matched with the base station determined by the service determination unit 62. Therefore, the switching instruction unit 63 fails to instruct the call request unit 64 to switch a call request.

(Step S64) From the switching instruction unit 63, the call request unit 64 fails to receive an instruction for switching a call request. Accordingly, the call request unit 64 performs a call request to the femtocell base station 12 in which the search unit 44a is put in the waiting state.

FIG. 17 is a part two of a sequence diagram of the mobile communication system in the case where the service is registered. Suppose, for example, that the information illustrated in FIG. 14 is registered in the service TB 61.

(Step S71) Suppose that the search unit 44a is put in the waiting state in a femtocell of the femtocell base station 12.

(Step S72) Suppose that the user of the radio terminal 11 receives certain service by using the radio terminal 11. Based on the service to be received by the user, the service determination unit 62 refers to the service TB 61, and determines to perform a call request to a base station of which cell.

Suppose here that the user receives the service of a browser. Accordingly, the service determination unit 62 refers to the service TB 61, and determines to perform a call request to the macrocell base stations 21 and 22 each forming a macrocell.

(Step S73) The switching instruction unit 63 determines whether the base station in which the search unit 44a is put in the waiting state is matched with the base station determined by the service determination unit 62.

In the example of FIG. 17, at step S71, the search unit 44a is put in the waiting state in the femtocell base station 12. At step S72, the service determination unit 62 determines to perform a call request to the macrocell base stations 21 and 22. Accordingly, the switching instruction unit 63 determines that the base station in which the search unit 44a is put in the waiting state is not matched with the base station determined by the service determination unit 62. Therefore, the switching instruction unit 63 instructs the call request unit 64 to switch a call request.

(Step S74) The call request unit 64 receives an instruction for switching a call request from the switching instruction unit 63. Accordingly, the call request unit 64 searches for the macrocell base stations 21 and 22 capable of communication, and performs a call request to the found macrocell base stations 21 and 22.

As can be seen from the above sequence, in the case where belonging to both a femtocell and a macrocell and being incapable of accessing a server via one cell, the radio terminal 11 accesses the server via the other cell. As a result, a user receives a service desired by himself or herself.

According to the proposed apparatus and method, a user determines whether to continue an installation of a second base station which covers a communication dead zone of a first base station.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio terminal capable of communication with a macrocell base station and a femtocell base station, comprising:
a search unit configured to search for the macrocell base station capable of communication while put in a waiting state in the femtocell base station which covers a communication dead zone of the macrocell base station;
a notifying unit configured to notify a user that an installation location belongs to a zone of the macrocell base station in a case where radio wave conditions of the macrocell base station are improved and the macrocell base station is found by the search unit;
a call request unit configured to perform a call request to the femtocell or macrocell base station in the case where radio wave conditions of the macrocell base station are improved and the macrocell base station is found by the search unit;
a table configured to store service information to be received by the user and information of a service base station in association with the service information, the service base station being the femtocell or macrocell base station; and
a switching instruction unit configured to instruct, in a case where the service base station differs from a waiting state base station in which the search unit is put in the waiting state, the call request unit to switch from the waiting state base station to the service base station, the waiting state base station being the femtocell or macrocell base station.

2. The radio terminal according to claim 1, wherein a communication area of the femtocell base station is smaller than a communication area of the macrocell base station.

3. The radio terminal according to claim 1, wherein the search unit regularly searches for the macrocell base station while put in a waiting state in the femtocell base station installed by the user.

4. The radio terminal according to claim 1, further comprising a search instruction unit configured to instruct the search unit to regularly search for the macrocell base station capable of communication based on setting of the user.

5. The radio terminal according to claim 1, further comprising a switching instruction unit configured to instruct the search unit to enter into a waiting state in the macrocell base station based on setting or instruction of the user.

6. The radio terminal according to claim 1, wherein the switching instruction unit is further configured to instruct, in a case where the call request unit performs the call request to the waiting state base station but fails to access a server which provides service, the call request unit to perform the call request to the service base station.

7. The radio terminal according to claim 6, wherein the service base station is the macrocell base station and the waiting state base station is the femtocell base station.

8. The radio terminal according to claim 6, wherein the service base station is the femtocell base station and the waiting state base station is the macrocell base station.

9. The radio terminal according to claim 1, wherein the service base station is the macrocell base station and the waiting state base station is the femtocell base station.

10. The radio terminal according to claim 1, wherein the service base station is the femtocell base station and the waiting state base station is the macrocell base station.

11. A base station notification method of radio terminal capable of communication with a macrocell base station and a femtocell base station, comprising:
regularly searching, by a search unit, for the macrocell base station capable of communication while put in a waiting state in the femtocell base station which covers a communication dead zone of the macrocell base station;
notifying, by a notifying unit, in a case where radio wave conditions of the macrocell base station are improved and the macrocell base station is capable of communication is found, a user that an installation location belongs to a zone of the macrocell base station;
performing, by a call request unit, a call request to the femtocell or macrocell base station in the case where radio wave conditions of the macrocell base station are improved and the macrocell base station is found by the search unit;

storing service information at a table to be received by the user and information of a service base station in association with the service information, the service base station being the femtocell or macrocell base station; and instructing, by a switching instruction unit, in a case where the service base station differs from a waiting state base station in which the search unit is put in the waiting state, the call request unit to switch from the waiting state base station to the service base station, the waiting state base station being the femtocell or macrocell base station.

12. The method according to claim 11, wherein the service base station is the macrocell base station and the waiting state base station is the femtocell base station.

13. The method according to claim 11, wherein the service base station is the femtocell base station and the waiting state base station is the macrocell base station.

* * * * *